(12) United States Patent
Sheu et al.

(10) Patent No.: US 10,091,746 B2
(45) Date of Patent: Oct. 2, 2018

(54) SYNCHRONIZATION SOURCE DEVICE FOR SYNCHRONIZATION COVERAGE EXTENSION AND METHOD AND SYSTEM USING THE SAME

(71) Applicant: INDUSTRIAL TECHNOLOGY RESEARCH INSTITUTE, Hsinchu (TW)

(72) Inventors: Chorng-Ren Sheu, Kaohsiung (TW); Hua-Lung Tsai, Taipei (TW); Chun-Yi Wei, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 335 days.

(21) Appl. No.: 14/981,344

(22) Filed: Dec. 28, 2015

(65) Prior Publication Data

US 2016/0337992 A1 Nov. 17, 2016

Related U.S. Application Data

(60) Provisional application No. 62/161,327, filed on May 14, 2015.

(30) Foreign Application Priority Data

Dec. 7, 2015 (TW) .............................. 104140982 A

(51) Int. Cl.
*H04W 56/00* (2009.01)
*H04W 74/08* (2009.01)

(52) U.S. Cl.
CPC ..... *H04W 56/001* (2013.01); *H04W 56/0025* (2013.01); *H04W 56/0045* (2013.01); *H04W 74/0841* (2013.01)

(58) Field of Classification Search
CPC ..................... H04W 56/0045; H04W 74/0841
See application file for complete search history.

(56) References Cited

U.S. PATENT DOCUMENTS

2014/0269645 A1* 9/2014 Do .................... H04W 56/0065
370/338
2015/0009949 A1 1/2015 Khoryaev et al.
(Continued)

FOREIGN PATENT DOCUMENTS

| CN | 103347246 A | 10/2013 |
| CN | 104365035 A | 2/2015 |

(Continued)

OTHER PUBLICATIONS

3GPP, "3rd Generation Partnership Project; Technical Specification Group Radio Access Network; Study on LTE Device to Device Proximity Services; Radio Aspects (Release 12)," 3GPP TR 36.843, version 12.0.1, Mar. 27, 2014, pp. 1-50, XP051293307.

(Continued)

*Primary Examiner* — Chi H Pham
*Assistant Examiner* — Fahmida Chowdhury
(74) *Attorney, Agent, or Firm* — Birch, Stewart, Kolasch & Birch, LLP

(57) ABSTRACT

A synchronization source device includes a receiving circuit, a timing adjusting circuit and a transmitting circuit. The receiving circuit receives a first synchronization signal from an Evolved Node B (eNB). The timing adjusting circuit adjusts, according to a timing indicator, a timing of transmission of a second synchronization signal in response to the first synchronization signal, wherein a timing of the second synchronization signal is corresponding to a timing of the first synchronization signal. The transmitting circuit (Continued)

transmits the timing indicator as well as the second synchronization signal based on the adjusted timing of transmission.

21 Claims, 6 Drawing Sheets

(56) References Cited

U.S. PATENT DOCUMENTS

| | | | |
|---|---|---|---|
| 2015/0030015 A1 | 1/2015 | Chu | |
| 2015/0117375 A1* | 4/2015 | Sartori | H04W 56/001 370/329 |
| 2015/0215763 A1 | 7/2015 | Ro et al. | |
| 2015/0215903 A1 | 7/2015 | Zhao et al. | |
| 2015/0264588 A1* | 9/2015 | Li | H04W 56/0015 370/350 |
| 2015/0327201 A1* | 11/2015 | He | H04W 48/16 370/336 |
| 2015/0341934 A1* | 11/2015 | Sorrentino | H04B 7/2656 370/329 |
| 2016/0112979 A1 | 4/2016 | Takano | |
| 2017/0325231 A1* | 11/2017 | Sorrentino | H04L 5/001 |

FOREIGN PATENT DOCUMENTS

| | | | |
|---|---|---|---|
| EP | 2938142 A1 | 10/2015 | |
| TW | 201507536 A | 2/2015 | |
| WO | WO 2014/098522 A1 | 6/2014 | |
| WO | WO 2015/015924 A1 | 2/2015 | |
| WO | WO 2015/137781 A1 | 9/2015 | |

OTHER PUBLICATIONS

European Office Action, dated Oct. 20, 2017, for European Application No. 16159441.1.

Berggren et al., "Primary Sychronization Signal for D2D Communications in LTE-Advanced", IEEE Communications Letters, vol. 19, No. 7, Jul. 2015, pp. 1241-1244.

Kim et al., "Performance Analysis for Time Synchronization of D2D Communication in Heterogeneous Networks", NICT, 17th International Symposium on Wireless Personal Multimedia Communications (WPMC2014), 2014, pp. 300-305.

Lee et al., "A Fine Timing Synchronization Method on Group Communication System Enablers for LTE", IEEE, 2013 19th Asia-Pacific Conference on Communications (APCC), 2013, pp. 21-25.

Lee et al., "A Multi-Hop Relay Based Frequency Synchronization for D2D Communication in 3GPP LTE System", IEEE, ICUFN, 2015, pp. 766-771.

Lee et al., "A Timing Synchronization Method for D2D Communication in Asynchronous Cellular System", IEEE, APCC, 2014, pp. 366-371.

Sun et al., "Distributed Clock Synchronization With Application of D2D Communication Without Infrastructure", IEEE, Globecom 2013 Workshop—International Workshop on Device-to-Device (D2D) Communication With and Without Infrastructure, 2013, pp. 561-566.

ETRI, "On the D2DSS and PD2DSCH," 3GPP TSG-RAN1 Meeting #75, R1-135277, San Francisco, USA, Nov. 11-15, 2013, pp. 1-7.

Taiwanese Office Action and Search Report issued in Taiwanese Application No. 104140982, dated Feb. 23, 2017.

* cited by examiner

SYNCHRONIZATION SOURCE DEVICE FOR SYNCHRONIZATION COVERAGE EXTENSION AND METHOD AND SYSTEM USING THE SAME

This application claims the benefit of U.S. provisional application Ser. No. 62/161,327, filed May 14, 2015, and the benefit of Taiwan application Serial No. 104140982, filed Dec. 7, 2015, the disclosures of which are incorporated by reference herein in its entirety.

TECHNICAL FIELD

The disclosure relates to a synchronization source device for synchronization coverage extension, and a method and a system using the same.

BACKGROUND

How to synchronize timings of a plurality of devices effectively is an issue to be addressed in communication field. According to the current communication specification, the synchronization timing of an Evolved Node B (eNB) can be passed by one or more synchronization source devices to extend to other devices. However, when a device receives more than one synchronization signal from more than one synchronization source device at the same time, these synchronization signals may collide with each other and failed to be detected, such that the device cannot synchronize to the eNB.

Therefore, there is a need to prove a communication technology to mitigate the collision issue.

SUMMARY

The disclosure is directed to a synchronization source device for synchronization coverage extension and a method and a system using the same, in which the timings of transmission of synchronization signals are staggered from each other, so the occurrence of signal collision can be reduced, and the eNB's synchronization coverage can then be extended.

According to one embodiment, a synchronization source device is provided. The synchronization source device includes a receiving circuit, a timing adjusting circuit and a transmitting circuit. The receiving circuit receives a first synchronization signal from an Evolved Node B (eNB). The timing adjusting circuit adjusts, according to a timing indicator, a timing of transmission of a second synchronization signal in response to the first synchronization signal, wherein a timing of the second synchronization signal is corresponding to a timing of the first synchronization signal. The transmitting circuit transmits the timing indicator as well as the second synchronization signal based on the adjusted timing of transmission.

According to another embodiment, a communication method for a synchronization source device is provided. The communication method includes steps of: receiving a first synchronization signal from an Evolved Node B (eNB); in response to the first synchronization signal, adjusting a timing of transmission of a second synchronization signal according to a timing indicator, wherein a timing of the second synchronization signal is corresponding to a timing of the first synchronization signal; and transmitting the timing indicator as well as the second synchronization signal based on the adjusted timing of transmission.

According to an alternative embodiment, a communication system is provided. The communication system includes an Evolved Node B (eNB), a first synchronization source device, a second synchronization source device and a remote user equipment (UE). The eNB transmits a first synchronization signal. The first synchronization source device receives the first synchronization signal from the eNB, and is assigned with a first timing indicator, wherein the first synchronization source device adjusts a timing of transmission of a second synchronization signal according to the first timing indicator, and transmits the first timing indicator as well as the second synchronization signal based on the adjusted timing of transmission of the second synchronization signal, wherein a timing of the second synchronization signal is corresponding to a timing of the first synchronization signal. The second synchronization source device receives the first synchronization signal from the eNB, and is assigned with a second timing indicator, wherein the second synchronization source device adjusts a timing of transmission of another second synchronization signal according to the second timing indicator, and transmits the second timing indicator as well as the other second synchronization signal based on the adjusted timing of transmission of the other second synchronization signal, wherein a timing of the other second synchronization signal is corresponding to the timing of the first synchronization signal. The remote UE receives the second synchronization signal, the other second synchronization signal, the first timing indicator and the second timing indicator, recovers the timing of transmission of the second synchronization signal according to the first timing indicator, recovers the timing of transmission of the other second synchronization signal according to the second timing indicator, and obtains the timing of the first synchronization signal accordingly.

Figure 1:
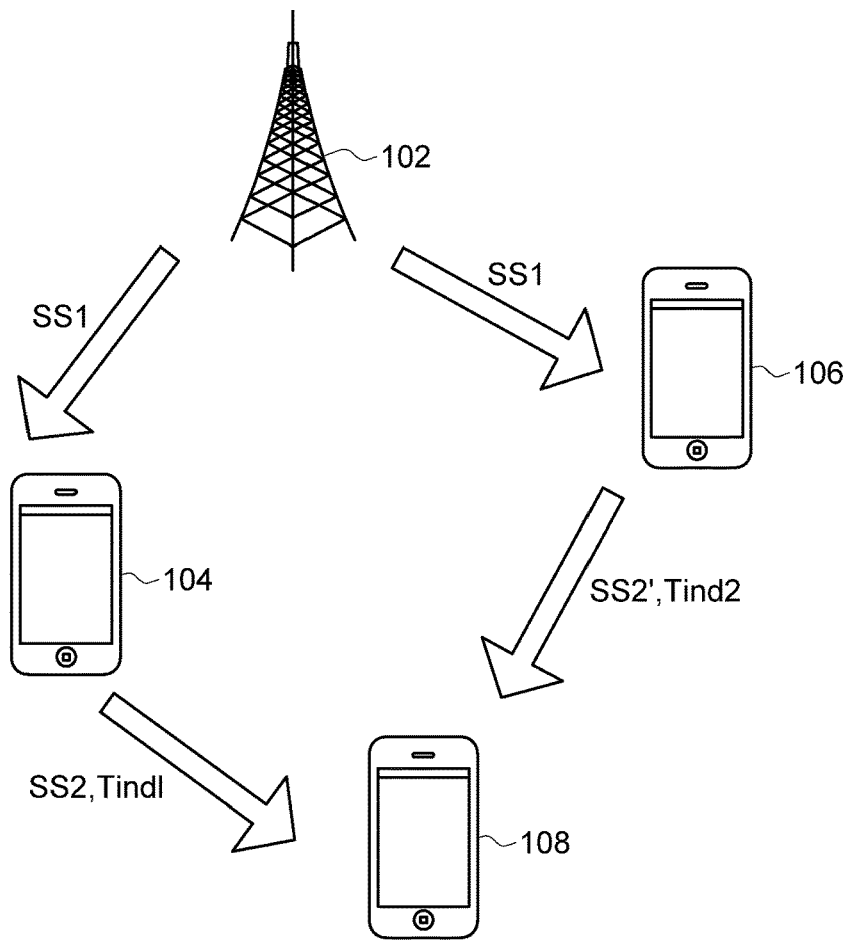
FIG. 1 shows a schematic diagram of a communication system according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

FIG. 1 shows a schematic diagram of a communication system according to an embodiment of the present disclosure. As shown in FIG. 1, the communication system 100 includes an Evolved Node B (eNB) 102, a plurality of synchronization source devices, such as a first synchronization source device 104 and a second synchronization source device 106, and a remote user equipment (UE) 108. The synchronization source device can be a UE, which would act as an independent synchronization source or a dependent synchronization source, depending on the network conditions. When acted as the independent synchronization source, the device may use its own timing to send out a synchronization signal. When acted as a dependent synchronization source, the device may response to an external synchronization signal to send out the synchronization signal of which the timing is corresponding to that of the external synchronization signal.

The eNB 102 may send a first synchronization signal SS1 to synchronize other devices. In an example, the first synchronization signal SS1 may include a Primary Synchronization Signal (PSS) and a Secondary Synchronization Signal (SSS).

In general, when receiving the first synchronization signal SS1 from the eNB 102, the synchronization source devices would act as dependent synchronization sources and send out the second synchronization signals (e.g., SS2/SS2') to other devices in response to the first synchronization signal SS1 almost at the same time. However, this would increase the opportunities of signal collision at the devices receiving the second synchronization signals (e.g., SS2/SS2'). Accordingly, in the embodiments of the present disclosure, the synchronization source device may exploit a timing indicator to adjust the timing of transmission of the second synchronization signal (e.g., SS2/SS2'), so as to mitigate the collision issue due to the synchronization source devices sending the second synchronization signals (e.g., SS2/SS2') at the same time. In this way, for a remote UE outside of the eNB 102's signal coverage or in a shadowed area or at the coverage's edge, it can still synchronize to the eNB 102 indirectly, so the synchronization coverage of the eNB 102 can be extended.

As shown in FIG. 1, the first synchronization source device 104 receives the first synchronization signal SS1 from the eNB 102 and is assigned with a first timing indicator Tind1. The first synchronization source device 104 adjusts the timing of transmission of a second synchronization signal SS2 according to the first timing indicator Tind1, and transmits the first timing indicator Tind1 as well as the second synchronization signal SS2 based on the adjusted timing of transmission of the second synchronization signal SS2. The timing of the second synchronization signal SS2 is corresponding to that of the first synchronization signal SS1.

On the other hand, the second synchronization source device 106 receives the first synchronization signal SS1 from the eNB 102 and is assigned with a second timing indicator Tind2. The second synchronization source device 106 adjusts the timing of transmission of an another second synchronization signal SS2' according to the second timing indicator Tind2, and transmits the second timing indicator Tind2 as well as the another second synchronization signal SS2' based on the adjusted timing of transmission of the another second synchronization signal SS2'. The timing of the another second synchronization signal SS2' is corresponding to that of the first synchronization signal SS1.

The timing of transmission of the second synchronization signal SS2 for the first synchronization source device 104 and the timing of transmission of the another second synchronization signal SS2' for the second synchronization source device 106 may be staggered from each other by using the first and second timing indicators Tind1, Tind2.

The remote UE 108 receives the second synchronization signal SS2 from the first synchronization source device 104, the another second synchronization signal SS2' from the second synchronization source device 106, the first timing indicator Tind1, and the second timing indicator Tind2. The remote UE 108 may recover the timing of transmission of the second synchronization signal SS2 according to the first timing indicator Tind1, and further recover the timing of transmission of the another second synchronization signal SS2' according to the second timing indicator Tind2, so as to obtain the timing of the first synchronization signal SS1.

In the example of FIG. 1, the remote UE 108 may be outside of the eNB 102's signal coverage (or at the edge of the signal coverage) or be shadowed by some obstacles, causing that the remote UE 108 cannot receive the first synchronization signal SS1 from the eNB 102 directly. Through the second synchronization signals (e.g., SS2/SS2') from the synchronization source devices (e.g., 104, 106), the remote UE 108 may get the eNB 102's timing indirectly and then synchronize to the eNB 102. Since the timings of transmission of the second synchronization signals (e.g., SS2/SS2') for the synchronization source devices are staggered from each other by using the timing indicators, the remote UE 108 is more easily to detect the received second synchronization signals (SS2/SS2') and hence the chance of successful synchronization is increased, such that the eNB 102's synchronization coverage is effectively extended. After the remote UE 108 gets the eNB 102's timing indirectly and synchronizes to the eNB 102, the remote UE 108 may turn to be a dependent synchronization source device and then send out the synchronization signal to further extend the eNB 102's synchronization coverage.

Figure 2:
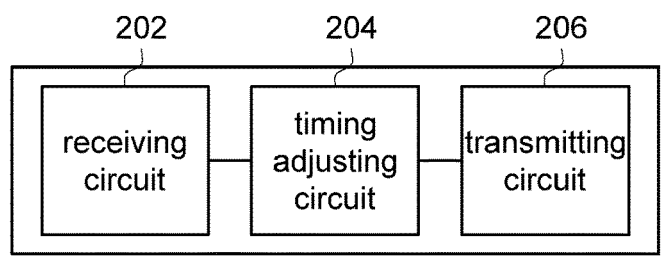
FIG. 2 shows a block diagram of a synchronization source device according to an embodiment of the present disclosure.

FIG. 2 shows a block diagram of a synchronization source device according to an embodiment of the present disclosure. As shown in FIG. 2, the synchronization source device 200 includes a receiving circuit 202, a timing adjusting circuit 204 and a transmitting circuit 206. The receiving circuit 202 includes, for example, a wireless signal receiver. The receiving circuit 202 may receive the first synchronization signal (e.g., SS1) from the eNB. By detecting the first synchronization signal, the synchronization source device 200 can obtain the eNB's reference timing and use it to analyze out the control signal and/or other information received from the eNB.

The timing adjusting circuit 204 may adjust, according to the timing indicator (e.g., Tind1/Tind2 in FIG. 1), the timing of transmission of the second synchronization signal (e.g., SS2/SS2' in FIG. 1) in response to the first synchronization signal, wherein the timing of the second synchronization signal is corresponding to that of the first synchronization signal, e.g., there is a specific phase difference between the first and second synchronization signals.

In the embodiments of the present disclosure, different values of the timing indicator correspond to at least two different timings of transmission of the second synchronization signal. For example, the timing adjusting circuit 204 may, according to the timing indicator, (1) adjust a time offset for the timing of transmission of the second synchronization signal, and/or (2) determine whether to transmit the second synchronization signal in a synchronization signal transmission period. The timing adjusting circuit 204 can be implemented by, for example, a special-purpose application circuit, a processor or other computing circuit(s).

The transmitting circuit 206 includes, for example, a wireless transmitter, which may transmit the timing indicator as well as the second synchronization signal (e.g., SS2/SS2' in FIG. 1) based on the adjusted timing of transmission. Transmitting the timing indicator (e.g., Tind1/Tind2 in FIG. 1) as well as the second synchronization signal makes the receiving device (e.g. the remote UE 108 in FIG. 1) possible to recover the original timing of transmission of the second synchronization signal according to the corresponding timing indicator, such that the receiving device can synchronize to the eNB's timing.

Figure 3A:
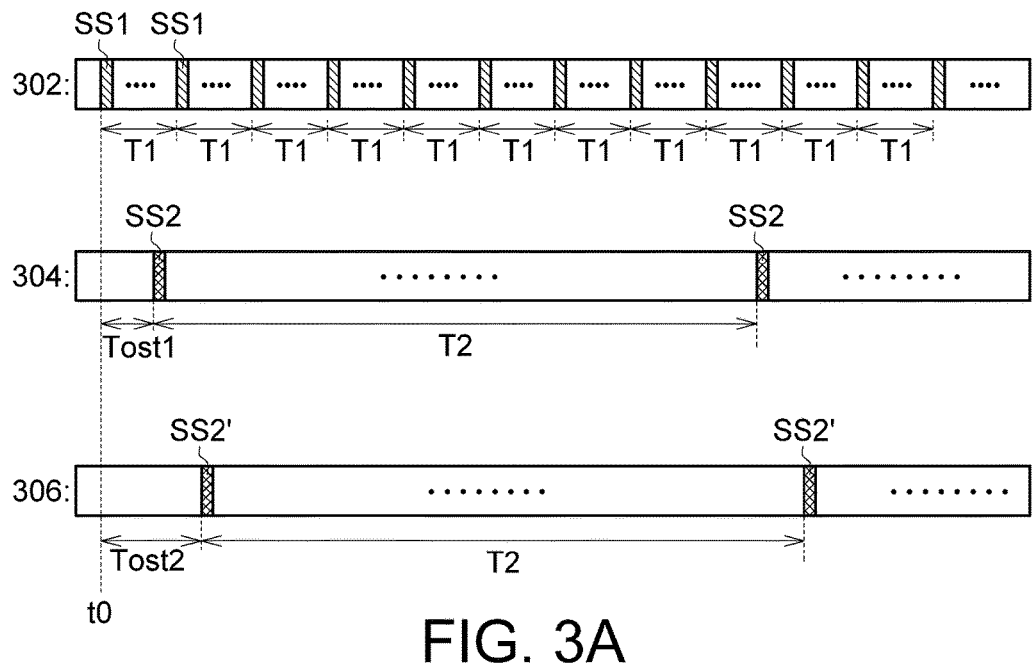
FIG. 3A and FIG. 3B illustrate two exemplary timings of transmission of the second synchronization signals for the first and second synchronization source devices shown in FIG. 1.
Figure 3B:
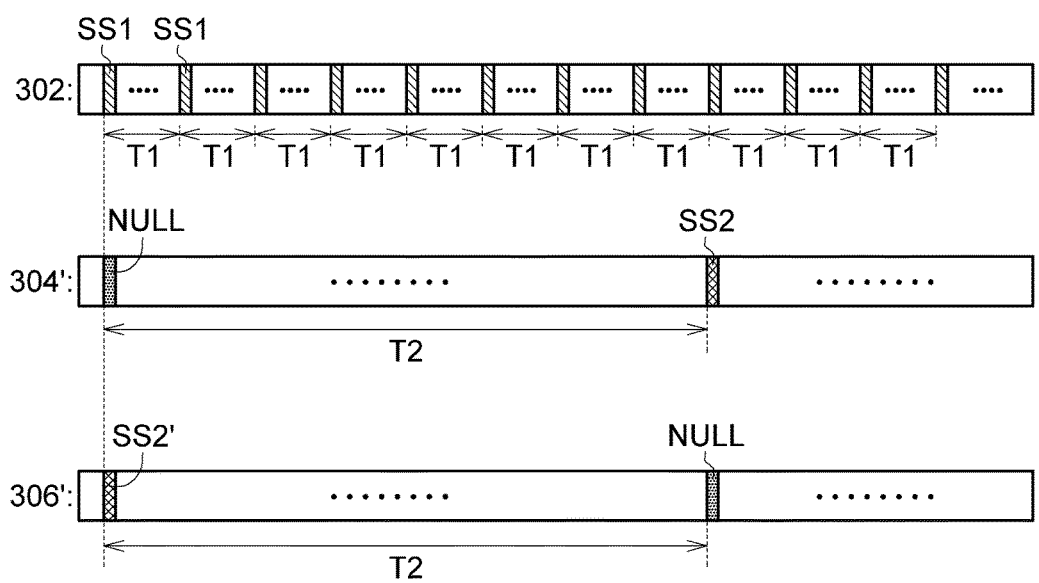

FIG. 3A and FIG. 3B illustrate two exemplary timings of transmission of the second synchronization signals SS2, SS2' for the first and second synchronization source devices 104, 106 shown in FIG. 1. In FIG. 3A, the sequence of timing 302 represents the timing of transmission of the first synchronization signal SS1 (e.g., PSS/SSS) for the eNB 102, of which the transmission period is T1 (e.g., 5 ms). The sequences of timings 304, 306 respectively represent the timings of transmission of the second synchronization signals SS2, SS2' for the first and second synchronization source devices 104, 106, of which the transmission periods are T2 (e.g., 40 ms).

In the example of FIG. 3A, the timing indicator Tind1/Tind2 is used to indicate an amount of time offset for the timing of transmission of the second synchronization signal SS2/SS2'. Specifically, given that the start timing at which a synchronization source device without using the proposed timing indicator responds to the eNB's first synchronization signal (e.g., PSS/SSS) to transmit the second synchronization signal is t0, the proposed synchronization source device may delay the timing of transmission of the second synchronization signal SS2/SS2' by a specific time offset from the timing t0 according to the timing indicator Tind1/Tind2.

As shown in the sequence of timing 304, the first synchronization source device 104 delays the start time to transmit the second synchronization signal SS2 by a time offset Tost1 from the timing t0 according to the amount of time offset indicated by the timing indicator Tind1. Likewise, as shown in the sequence of timing 306, the second synchronization source device 106 delays the start time to transmit the another second synchronization signal SS2' by a time offset Tost2 from the timing t0 according to the amount of time offset indicated by the timing indicator Tind2. Thus, by appropriately selecting the values of the first and second timing indicators Tind1, Tind2 to ensure that the amounts of the time offsets Tost1 and Tost2 are different, the start time at which the first and second synchronization source devices 104, 106 respond to the first synchronization signal SS1 to transmit the second synchronization signals SS2, SS2' can be staggered from each other. In this way, the synchronization signal collision occurred at the receiving device (e.g., the remote UE 108 in FIG. 1) can be prevented.

In the example of FIG. 3B, the first synchronization source device 104 selectively transmits the second synchronization signal SS2 or provides a null representation NULL in the synchronization signal transmission period T2 according to the first timing indicator Tind1, and the second synchronization source device 106 selectively provides the null representation NULL or transmits the another second synchronization signal SS2' in the synchronization signal transmission period T2 according to the second timing indicator Tind2. As shown in the sequences of timings 304' and 306', the second synchronization source device 106 may provide the null representation NULL when the first synchronization source 104 device selects to transmit the second synchronization signal SS2, and the second synchronization source device 106 may transmit the another second synchronization signal SS2' when the first synchronization source device 104 selects to provide the null representation NULL. Said null representation NULL can be implemented by any means for representing that the second synchronization signal SS2/SS2' is not to be sent, e.g., not to send signal(s) or sending information irrelevant to the synchronization.

Figure 4:
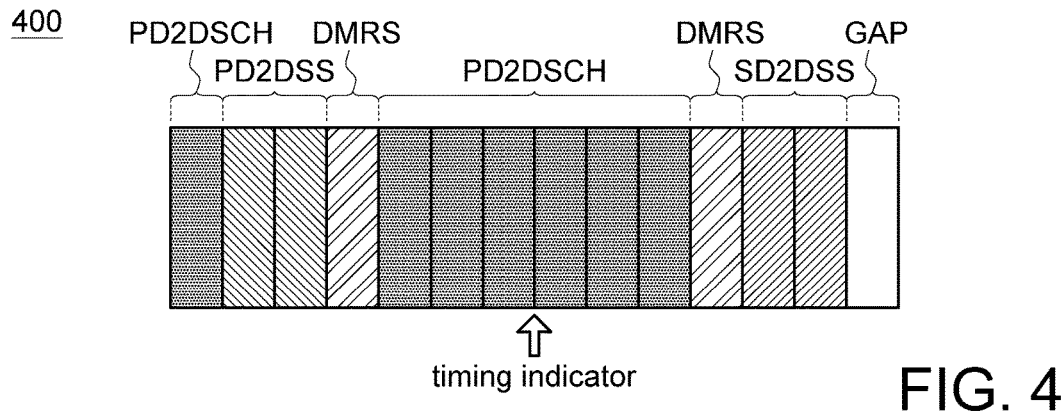
FIG. 4 shows a schematic diagram of a Device-to-Device (D2D) synchronization subframe in which the content is used to implement the second synchronization signal, the timing indicator.

FIG. 4 shows a schematic diagram of a Device-to-Device (D2D) synchronization subframe 400 in which the content is used to implement the second synchronization signal, the timing indicator. The D2D synchronization subframe 400 includes 2 Primary Device-to-Device Synchronization Signal (PD2DSS) symbols, 2 Secondary Device-to-Device Synchronization Signal (SD2DSS) symbols, 2 Demodulation Reference Signal (DMRS) symbols, 1 GAP symbol, and 7 Physical Device-to-Device Synchronization Channel (PD2DSCH) symbols. In an embodiment, the second synchronization signal sent by the synchronization source device is implemented with D2DSS, which is defined by PD2DSS and SD2DSS. That is, the second synchronization signal may include PD2DSS and SD2DSS.

For the synchronization source devices directly receiving the eNB's reference timing, they send D2DSS (called "D2DSSue_net") including PD2DSS symbols having the same root value (e.g., root=26). On the other hand, for the synchronization source devices not to receive the synchronization timing from the eNB, they send D2DSS (called "D2DSSue_oon") including PD2DSS symbols having another root value (e.g., root=37). Since SD2DSS is corresponding to the synchronization source device's identifier (ID), SD2DSS sent from different synchronization source devices correspond to different values. PD2DSCH can be used to carry control messages. In an embodiment, PD2DSCH of the D2D synchronization subframe 400 carries the proposed timing indicator.

Figure 5:
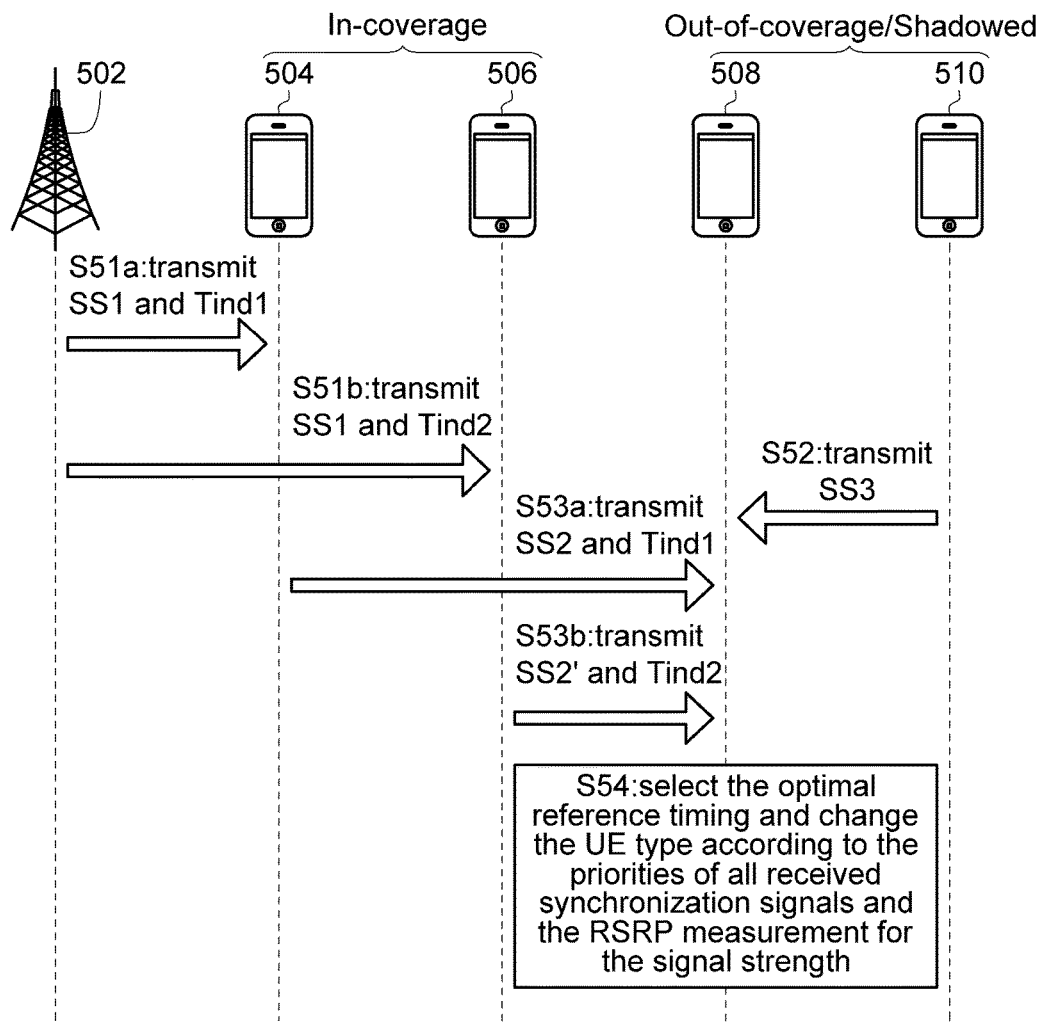
FIG. 5 shows a flowchart of a communication method of a communication system according to an embodiment of the present disclosure.

FIG. 5 shows a flowchart of a communication method of a communication system 500 according to an embodiment of the present disclosure. In FIG. 5, the communication system 500 includes an eNB 502, synchronization source devices 504, 506, 510, and a remote UE 508. The synchronization source devices 504 and 506 are located in the signal coverage of the eNB 502, and can receive the eNB 502's reference timing directly. The synchronization source device 510 and the remote UE 508 are located, for example, outside of the eNB 502's signal coverage (or at the coverage edge with low signal strength), or in the shadowed area of the eNB 502's signal coverage, which cannot receive the eNB 502's reference timing directly.

At steps S51a and S51b, the eNB 502 transmits the first synchronization signal SS1 (e.g., PSS/SSS) to the synchronization source devices 504 and 506, and assigns the synchronization source devices 504 and 506 with timing indicators Tind1 and Tind2, respectively. The timing indicator Tind1/Tind2 can be included in a control signal from the eNB 502, such as System Information Block (SIB), Radio Resource Control (RRC) or any other control signal/message. In an embodiment, the value of the timing indicator Tind1/Tind2 can be scheduled by the eNB 502. For example, the eNB 502 may determine the values of the timing indicators Tind1 and Tind2 according to the locations of the synchronization source devices 504 and 506. However, the present is not limited thereto, and the eNB 502 may schedule the value of the timing indicator Tind1/Tind2 according to the network conditions and/or the deployment of devices. In another embodiment, the eNB may generate the value of the timing indicator randomly.

At step S52, the synchronization source device 510 acting as an independent synchronization source sends out an independent synchronization signal SS3 (e.g., D2DSSue_oon) based on its own timing. In some embodiments, the communication system 500 may not to include the independent synchronization source, e.g., the synchronization source device 510, and thus step S52 can be omitted.

At steps S53a and S53b, the synchronization source devices 504 and 506 transmit the second synchronization signals SS2 and SS2' (e.g., D2DSSue_net) as well as the timing indicators Tind1 and Tind2 to the remote UE 508 based on the adjusted timings of transmission indicated by the timing indicators Tind1 and Tind2, respectively.

At step S54, the remote UE 508 selects the optimal reference timing and changes its UE type correspondingly according to the priorities of all received synchronization signals (e.g., the second synchronization signals SS2 and SS2' and the third synchronization signal SS3 (if exists)) and the Reference Signal Received Power (RSRP) measurement for the signal strength. For example, if the remote UE 508 in the beginning only receives the synchronization signal from the synchronization source device 510 located outside of the eNB 502's coverage, the remote UE 508 may select the synchronization source device 510's synchronization signal as its reference of synchronization timing, and set the UE type as a UE that synchronizes to an out-of-coverage synchronization signal. If the synchronization source device 508 then selects a synchronization signal which is sent from an in-coverage synchronization source device and corresponding to a larger RSRP as its reference timing, the UE type will be correspondingly changed to a UE that synchronizes to an in-coverage synchronization signal.

Since the synchronization source devices 504 and 506 may transmit the second synchronization signals SS2 and SS2' based on staggered timings, the remote UE 508 receiving these two signals SS2 and SS2' can detect them correctly and execute the subsequent operations (e.g., step S54 in FIG. 5) to select the synchronization timing. Through the above-mentioned mechanism, the synchronization coverage of the eNB 502 can be extended to the remote UE 508.

Figure 6:
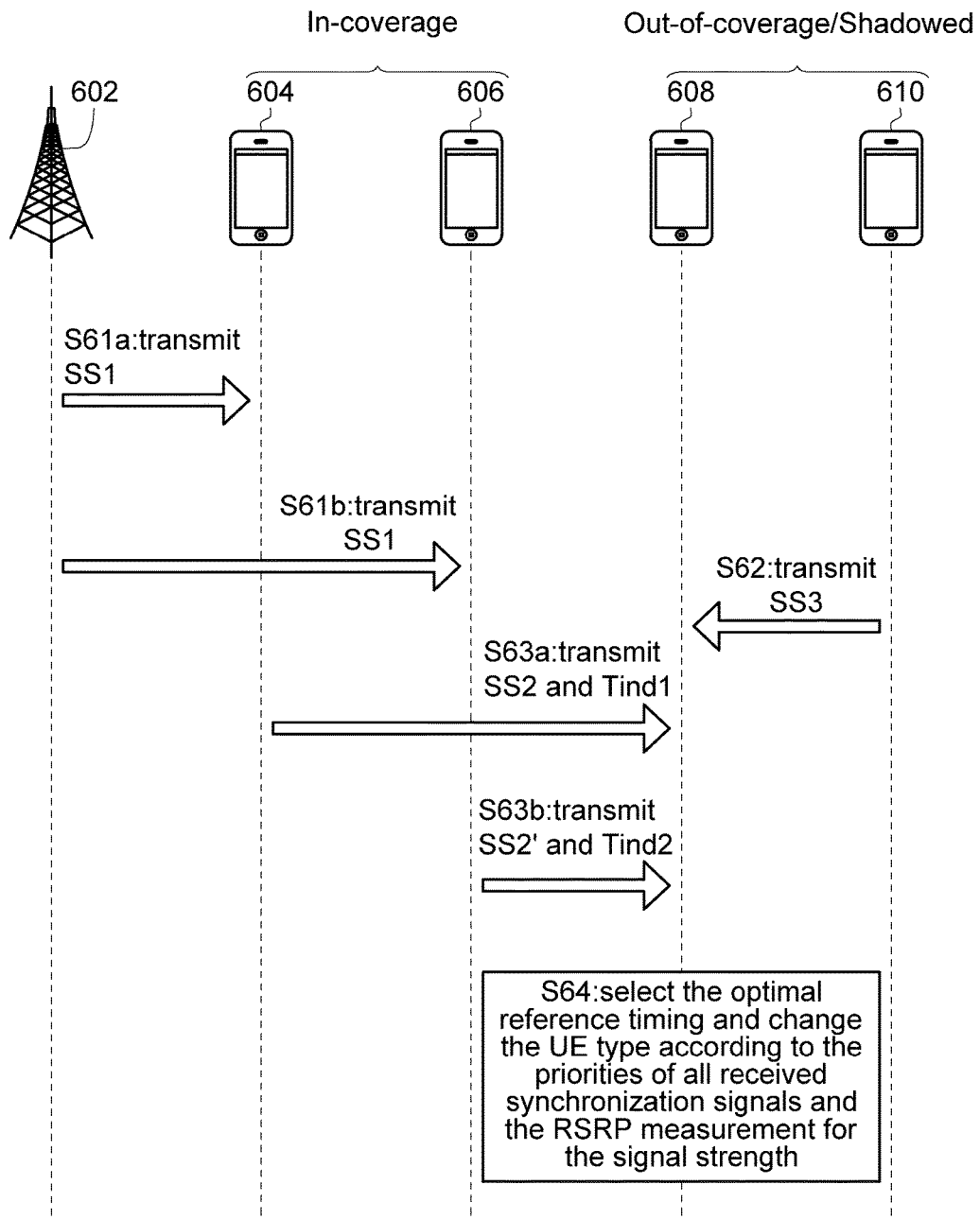
FIG. 6 shows an another flowchart of a communication method of a communication system according to an embodiment of the present disclosure.

FIG. 6 shows an another flowchart of a communication method of a communication system 600 according to an embodiment of the present disclosure. Similar to FIG. 5, in the example of FIG. 6, the communication system 600 includes an eNB 602, synchronization source devices 604, 606, 610, and a remote UE 608. The synchronization source devices 604 and 606 are located in the signal coverage of the eNB 602, and can receive the eNB 602's reference timing directly. The synchronization source device 610 and the remote UE 608 are located, for example, outside of the eNB 602's signal coverage (or at the coverage edge with low signal strength), or in the shadowed area of the signal coverage of the eNB 602, which cannot receive the eNB 602's reference timing directly.

In this embodiment, the value of the timing indicator can be selected by the synchronization source device randomly. As shown in FIG. 6, at steps S61a and S61b, the eNB 602 transmits the first synchronization signal S51 (e.g., PSS/SSS) to the synchronization source devices 604 and 606 located in the signal coverage.

At step S62, the synchronization source device 610 acting as an independent synchronization source sends out an independent synchronization signal SS3 (e.g., D2DSSue_oon) based on its own timing. In some embodiments, the communication system 600 may not to include the independent synchronization source, e.g., the synchronization source device 610, and thus step S62 can be omitted.

At steps S63a and S63b, the synchronization source devices 604 and 606 respectively generate the values of the timing indicators Tind1 and Tind2 randomly, and adjust the timings of transmission of the second synchronization signals SS2 and SS2' (e.g., D2DSSue_net) according to the generated timing indicators Tind1 and Tind2. Then, the second synchronization signals SS2 and SS2' as well as the corresponding timing indicators Tind1 and Tind2 are transmitted to the devices which cannot directly receive the eNB 602's synchronization timing, e.g., the remote UE 608.

Step S64 is similar to step S54 of FIG. 5, the remote UE 608 may select the optimal reference timing and changes its UE type correspondingly according to the priorities of all received synchronization signals (e.g., the second synchronization signals SS2, SS2' and the third synchronization signal SS3 (if exists)) and the RSRP measurement for the signal strength. Since the timings of transmission of the second synchronization signals SS2 and SS2' are randomly determined based on the timing indicators Tind1 and Tind2, the occurrence of collision between these two second synchronization signals SS2 and SS2' can be significantly reduced.

Figure 7:
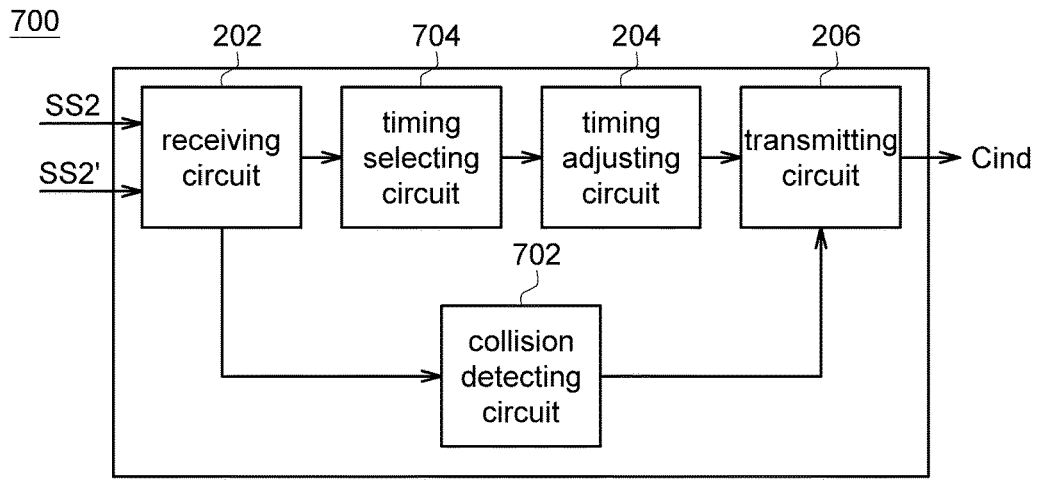
FIG. 7 shows a block diagram of a remote UE according to an embodiment of the present disclosure.

FIG. 7 shows a block diagram of a remote UE 700 according to an embodiment of the present disclosure. The remote UE 700 further includes a timing selecting circuit 704 and a collision detecting circuit 702. The timing selecting circuit 704 is used to determine the optimal reference synchronization timing. The collision detecting circuit 702 is used to detect whether a collision occurs from the received synchronization signals, and to transmit a collision indicator Cind through the transmitting circuit 206 when the collision is detected, wherein the collision indicator Cind would make a synchronization source device retransmitting a synchronization signal and reselecting its timing of transmission of the synchronization signal.

For example, when the remote UE 700 detects that a collision occurs in the received synchronization signals, the remote UE 700 may broadcast the collision indicator Cind to instruct these synchronization source devices to retransmit synchronization signals and reselect their timings of transmission of the synchronization signals, so as to prevent the synchronization signal collision from happening again.

Figure 8:
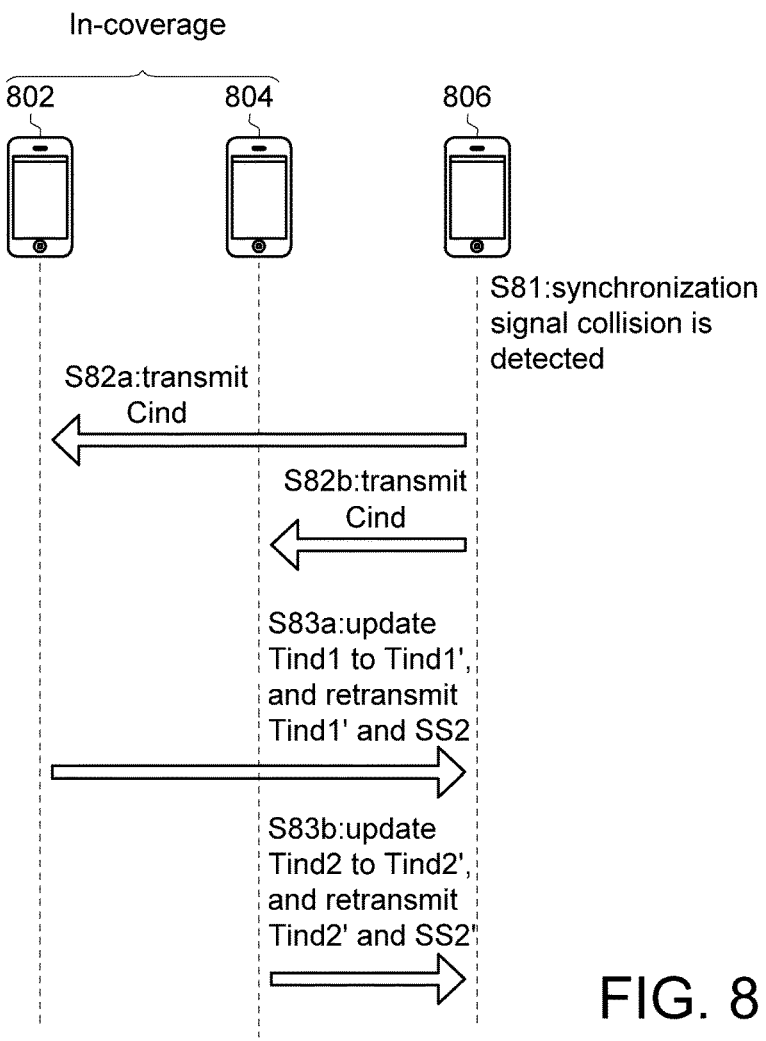
FIG. 8 shows a flowchart of a communication method using the collision indicator according to an embodiment of the present disclosure.

FIG. 8 shows a flowchart of a communication method using the collision indicator Cind according to an embodiment of the present disclosure. As shown in FIG. 8, at step S81, when detecting a collision occurring from the received synchronization signals, the remote UE 806 may send out the collision indicator Cind, as shown in steps S82a and S82b. The collision indicator Cind can be implemented in the PD2DSCH of the D2D synchronization subframe 400, for example. Then, at steps S83a and S83b, when the synchronization source devices 802 and 804 receive the collision indicator Cind, they may update their timing indicators Tind1 and Tind2 in response to the collision indicator Cind, reselect the timings of transmission of the second synchronization signals SS2 and SS2' according to the updated timing indicators Tind1' and Tind2', and retransmit the updated timing indicators Tind1' and Tind2' as well as the second synchronization signals SS2 and SS2' based on the reselected timings of transmission. Thus, if the second synchronization signals SS2 and SS2' which the synchronization source devices 802 and 804 transmit based on the timing indicators Tind1 and Tind2 still collide with each other (e.g., both of the synchronization source devices 802 and 804 randomly select the same value of the timing indicators), the synchronization source devices 802 and 804 can reselect the timings of transmission of the second synchronization signal SS2 and SS2' by using the collision indicator Cind returned from the receiving device (e.g., the remote UE 806), so as to prevent the synchronization signal collision from happening again.

It is understood that the collision detection and retransmission mechanism illustrated in FIG. 8 can be applied in each embodiment of the present disclosure. Take FIG. 5 for example, if the second synchronization signals SS2 and SS2' sent by the synchronization source devices 504 and 506 collide with each other at the remote UE 508, the remote UE 508 may execute steps of FIG. 8 to utilize the collision indicator Cind to make the synchronization source devices 504 and 506 update their timing indicators Tind1 and Tind2 and perform retransmission. The procedure of FIG. 8 can be executed repeatedly until the collision issue is addressed and solved. After that, step S54 can be executed to determine the synchronization reference timing. Likewise, take FIG. 6 for example, if the second synchronization signals SS2 and SS2' sent by the synchronization source devices 604 and 606 collide with each other at the remote UE 608, the remote UE 608 may execute steps of FIG. 8 to utilize the collision indicator Cind to make the synchronization source devices 604 and 606 update their timing indicators Tind1 and Tind2 and perform retransmission. The procedure of FIG. 8 can be executed repeatedly until the collision issue is addressed and solved. Then, step S64 can be executed to determine the synchronization reference timing.

Figure 9:
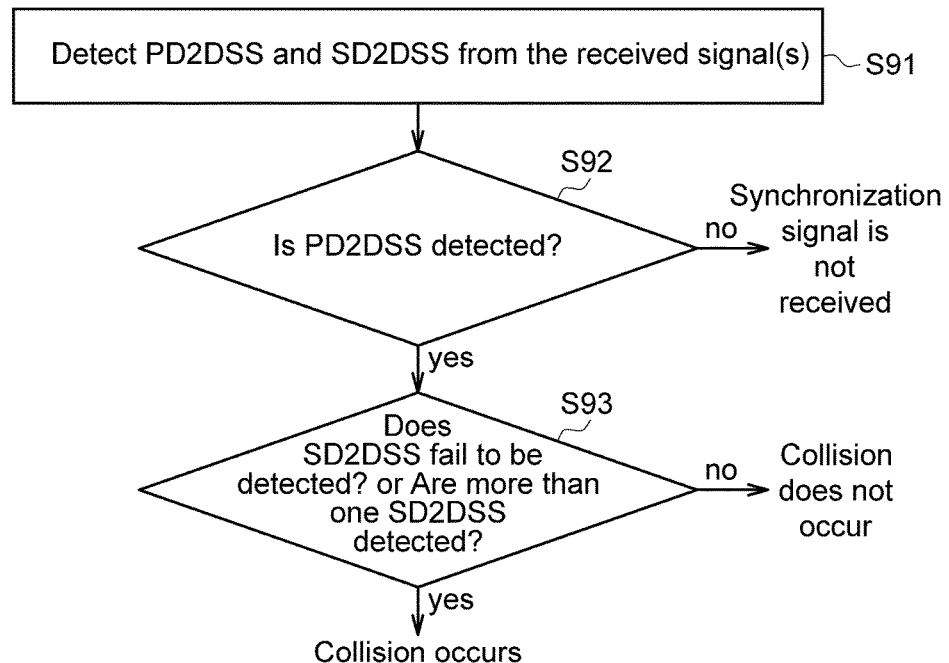
FIG. 9 shows an exemplary flowchart of detecting whether the second synchronization signals collide with each other according to an embodiment of the present disclosure.
Figure 10:
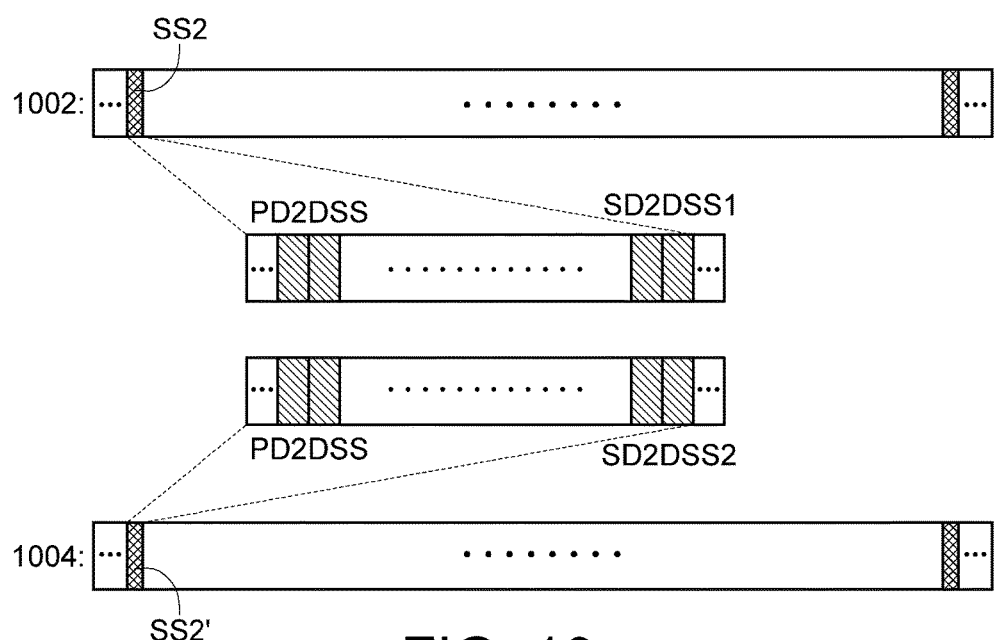
FIG. 10 shows a timing diagram in which the second synchronization signals collide with each other.

Refer to FIG. 9 and FIG. 10. FIG. 9 shows an exemplary flowchart of detecting whether the second synchronization signals SS2 and SS2' collide with each other according to an embodiment of the present disclosure. FIG. 10 shows a timing diagram in which the second synchronization signals SS2 and SS2' collide with each other. In the embodiment, the D2DSS is used as the proposed second synchronization signal SS2/SS2' for illustration.

As mentioned above, for the synchronization source devices receiving the eNB's reference timing, their PD2DSS of D2DSS may have the same value. Further, since the SD2DSS of D2DSS is corresponding to the signal source's ID, the synchronization source devices' SD2DSS may have different values. By using this characteristic, when a device receiving more than one DSDSS from the synchronization source devices found that it can detect the PD2DSS but cannot detect the SD2DSS, the device may determine that a collision occurs from the received synchronization signals. Further, even the PD2DSS cannot be detected, the device may determine that there is no synchronization signal received.

As illustrated in step S91, PD2DSS and SD2DSS are targets to be detected from the received signal. Then, at step S92, it is determined whether the PD2DSS can be detected out. If yes, the procedure continues to step S93. If not, it is determined that there is no synchronization signal received.

At step S93, it is determined whether the SD2DSS fails to be detected, or more than one SD2DSS are detected. If yes, it means that the synchronization signal collision occurs, and such collision results in the incorrect detecting result. If not, it can be determined that there is no synchronization signal collision. As shown in FIG. 10, the sequences of timings 1002 and 1004 respectively represent the timings of transmission of the second synchronization signals SS2 and SS2' for two synchronization source devices. If the timing indicators for the two synchronization signals SS2 and SS2' are the same, the timings of transmission of these two second synchronization signals SS2 and SS2' are likely to collide with each other. Given that both of the synchronization source devices receive the eNB's reference timing, their PD2DSS of the second synchronization signals SS2 and SS2' should be the same. Since the collision of two identical signals will result in a positive enhancement of the signal waveform, the receiving terminal can still detect the PD2DSS.

On the other hand, since the second synchronization signals SS2 and SS2' are from different synchronization source devices, their corresponding SD2DSS are different (e.g., SD2DSS1 and SD2DSS2 in FIG. 10). Hence, the synchronization signal collision will cause a failure detection of the SD2DSS, or an incorrect detecting result such as detecting more than one SD2DSS. Generally, it can be determined that a collision occurs if both of the following conditions are satisfied: (1) PD2DSS is detected, and (2) SD2DSS fails to be detected, or more than one SD2DSS are detected.

Based on the above, the proposed synchronization source device and method and system using the same may adjust the timing of transmission of the synchronization signal according to the timing indicator, and reselect the timing of transmission when receiving the collision indicator. Thus, the collision of synchronization signals can be prevented, and the eNB's synchronization coverage can then be extended.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:
1. A synchronization source device, comprising:
 a receiving circuit, receiving a first synchronization signal from an Evolved Node B (eNB);
 a timing adjusting circuit, adjusting, according to a timing indicator, a timing of transmission of a second synchronization signal in response to the first synchronization signal, wherein there is a specific phase difference between the first synchronization signal and the second synchronization signal; and a transmitting circuit, transmitting the timing indicator as well as the second synchronization signal based on the adjusted timing of transmission;

wherein the timing adjusting circuit adjusts a time offset of the timing of transmission of the second synchronization signal according to the timing indicator which is generated randomly by the eNB or the synchronization source device; or wherein the timing adjusting circuit determines whether to transmit the second synchronization signal in a synchronization signal transmission period according to the timing indicator.

2. The synchronization source device according to claim 1, wherein the timing indicator is included in a control signal from the eNB.

3. The synchronization source device according to claim 2, wherein the eNB generates a value of the timing indicator according to a location of the synchronization source device.

4. The synchronization source device according to claim 1, wherein the timing indicator is included in Physical Device-to-Device Synchronization Channel (PD2DSCH) of a Device-to-Device synchronization subframe.

5. The synchronization source device according to claim 1, wherein when the synchronization source device receives a collision indicator, the synchronization source device updates the timing indicator in response to the collision indicator, reselects the timing of transmission of the second synchronization signal according to the updated timing indicator, and retransmits the updated timing indicator as well as the second synchronization signal based on the reselected timing of transmission.

6. The synchronization source device according to claim 5, wherein the collision indicator is sent from a remote user equipment (UE), the remote UE determines whether a collision occurs from the received second synchronization signals, and sends the collision indicator when the collision is detected.

7. The synchronization source device according to claim 1, wherein the first synchronization signal comprises Primary Synchronization Signal (PSS) and Secondary Synchronization Signal (SSS).

8. The synchronization source device according to claim 1, wherein the second synchronization signal comprises Primary Device-to-Device Synchronization Signal (PD2DSS) and Secondary Device-to-Device Synchronization Signal (SD2DSS).

9. A communication method for a synchronization source device, comprising:
receiving a first synchronization signal from an Evolved Node B (eNB);
in response to the first synchronization signal, adjusting a timing of transmission of a second synchronization signal according to a timing indicator, wherein there is a specific phase difference between the first synchronization signal and the second synchronization signal; and
transmitting the timing indicator as well as the second synchronization signal based on the adjusted timing of transmission;
wherein the communication method further comprising:
adjusting a time offset of the timing of transmission of the second synchronization signal according to the timing indicator which is generated randomly by the eNB or the synchronization source device; or
determining whether to transmit the second synchronization signal in a synchronization signal transmission period according to the timing indicator.

10. The communication method according to claim 9, wherein the timing indicator is included in a control signal from the eNB.

11. The communication method according to claim 10, further comprising:
generating a value of the timing indicator according to a location of the synchronization source device by the eNB.

12. The communication method according to claim 9, wherein the timing indicator is included in Physical Device-to-Device Synchronization Channel (PD2DSCH) of a Device-to-Device synchronization subframe.

13. The communication method according to claim 9, further comprising:
when a collision indicator is received, updating the timing indicator in response to the collision indicator, and reselecting the timing of transmission of the second synchronization signal according to the updated timing indicator; and
retransmitting the updated timing indicator as well as the second synchronization signal based on the reselected timing of transmission.

14. The communication method according to claim 13, wherein the collision indicator is sent from a remote user equipment (UE), the remote UE determines whether a collision occurs from the received second synchronization signals, and sends out the collision indicator when the collision is detected.

15. The communication method according to claim 9, wherein the first synchronization signal comprises Primary Synchronization Signal (PSS) and Secondary Synchronization Signal (SSS).

16. The communication method according to claim 9, wherein the second synchronization signal comprises Primary Device-to-Device Synchronization Signal (PD2DSS) and Secondary Device-to-Device Synchronization Signal (SD2DSS).

17. A communication system, comprising:
an Evolved Node B (eNB), transmitting a first synchronization signal;
a first synchronization source device, receiving the first synchronization signal from the eNB, and being assigned with a first timing indicator, wherein the first synchronization source device adjusts a time offset of a timing of transmission of a second synchronization signal according to the first timing indicator which is generated randomly by the eNB or the first synchronization source device, and transmits the first timing indicator as well as the second synchronization signal based on the adjusted timing of transmission of the second synchronization signal, wherein there is a specific phase difference between the first synchronization signal and the second synchronization signal;
a second synchronization source device, receiving the first synchronization signal from the eNB, and being assigned with a second timing indicator, wherein the second synchronization source device adjusts a timing of transmission of an another second synchronization signal according to the second timing indicator, and transmits the second timing indicator as well as the another second synchronization signal based on the adjusted timing of transmission of the another second synchronization signal, wherein a timing of the another second synchronization signal is corresponding to the timing of the first synchronization signal; and
a remote user equipment (UE), receiving the second synchronization signal, the another second synchronization signal, the first timing indicator and the second timing indicator, recovering the timing of transmission of the second synchronization signal according to the first timing indicator, recovering the timing of transmission of the another second synchronization signal according to the second timing indicator, and obtaining the timing of the first synchronization signal accordingly.

18. The communication system according to claim 17, wherein the timing of transmission of the second synchronization signal for the first synchronization source device and the timing of transmission of the another second synchronization signal for the second synchronization source device are staggered from each other by the first and second timing indicators.

19. The communication system according to claim 17, wherein the eNB generates values of the first and second timing indicators according to locations of the first and second synchronization source devices.

20. The communication system according to claim 17, wherein the first synchronization source device selectively transmits the second synchronization signal or provides a null representation in a synchronization signal transmission period according to the first timing indicator, and the second synchronization source device selectively provides the null representation or transmits the another second synchronization signal in the synchronization signal transmission period according to the second timing indicator;

wherein the second synchronization source device provides the null representation when the first synchronization source device selects to transmit the second synchronization signal, and the second synchronization source device transmits the another second synchronization signal when the first synchronization source device selects to provide the null representation.

21. The communication system according to claim 17, wherein the remote UE determines whether a collision occurs from the received second synchronization signal and the received another second synchronization signal, and sends a collision indicator when the collision is detected to make the first and second synchronization source devices to reselect the timings of transmission of the second synchronization signal and the another second synchronization signal.

* * * * *